(12) United States Patent
Nemoto

(10) Patent No.: US 6,731,195 B2
(45) Date of Patent: May 4, 2004

(54) TAMPER-RESISTANT THEFT DETERRENT METHOD AND SYSTEM

(75) Inventor: Kazuo Nemoto, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/131,690

(22) Filed: Apr. 24, 2002

(65) Prior Publication Data

US 2002/0163418 A1 Nov. 7, 2002

(30) Foreign Application Priority Data

May 1, 2001 (JP) ...................................... 2001-133749

(51) Int. Cl.[7] ................................................ H04Q 9/00

(52) U.S. Cl. .............. 340/5.2; 340/426.13; 340/426.11; 180/287; 307/10.3

(58) Field of Search ................... 340/426.13, 426.11, 340/426.14, 425.5, 5.2, 825.31, 825.32; 180/287; 307/10.3, 10.2

(56) References Cited

U.S. PATENT DOCUMENTS

| 5,276,728 | A | * | 1/1994 | Pagliaroli et al. | .............. 379/58 |
| 5,459,448 | A | * | 10/1995 | Dortenzio et al. | .......... 340/426 |
| 5,721,550 | A | * | 2/1998 | Lopez | .......... 341/176 |
| 5,945,936 | A | * | 8/1999 | Issa | .......... 341/176 |
| 5,990,785 | A | * | 11/1999 | Suda | .......... 340/426 |
| 6,329,901 | B2 | * | 12/2001 | Brinkmeyer et al. | ......... 340/5.4 |

* cited by examiner

Primary Examiner—Anh V La
(74) Attorney, Agent, or Firm—Gerald R. Woods

(57) ABSTRACT

A tamper-resistant anti-theft system suitable for vehicles includes a radio signal receiver capable of receiving periodically broadcast keep-alive signals. The keep-alive signals, each coded for a particular protected vehicle, are provided by a monitoring agency with which the protected property is registered. The anti-theft system includes logic for validating a received signal. The system also includes a run signal generator for generating a limited-duration run signal that permits the protected property to be used normally for the duration. If the vehicle is reported stolen, the monitoring agency stops broadcasting keep-alive signals for the vehicle. Once the current run signal lapses, operations are initiated to prevent further normal use of the vehicle. Property other than vehicles can be protected by the system.

4 Claims, 10 Drawing Sheets

TAMPER-RESISTANT THEFT DETERRENT METHOD AND SYSTEM

FIELD OF THE INVENTION

The present invention relates to a theft deterrent method and system and more particularly to a tamper-resistant theft deterrent method or system that can be used to protect different kinds of property.

BACKGROUND OF THE INVENTION

A conventional vehicle anti-theft system interprets the breaking of a vehicle window or an unauthorized key manipulation as an attempt to steal the vehicle. The system reacts by sending a theft alarm signal to a monitoring agency, such as a security company or a property management company. The monitoring agency may send its own vehicles to investigate and/or may notify the local police that an attempted theft is in progress.

The prior also teaches that an anti-theft system of the type described above may be enhanced by the use of a system that can disable the vehicle by transmitting a specific type of radio signal to the vehicle from a remote security agency.

One problem with a conventional vehicle anti-theft system is that the thief can disable the system by disabling the radio transmitter used to send a theft alarm signal to the monitoring agency. A number of options are open to the thief. The thief may cut the wires to the antenna, break the antenna, smash the radio transmitter or transmit a jamming radio wave. If the monitoring agency never receives the theft alarm signal, it has no way of knowing that the theft has occurred.

A thief can similarly defeat the type of system which relies on a disabling signal from a remote security agency by breaking or removing the receiving antenna, cutting the electrical wires to the receiving antenna, transmitting a jamming signal, etc., to prevent the disabling signal from ever reaching the vehicle.

Given the relative ease with which existing anti-theft systems can be disabled, such systems have only a limited effect on a determined, knowledgeable thief.

Some of the problems with existing anti-theft systems might be solved by making the system components harder to break or by concealing components, such as the transmitting or receiving antennas and the wires leading to them. Such measures may slow down a thief but will probably not stop him and will almost certainly add to the costs of buying, installing and maintaining the system. Moreover, such measures will be completely ineffective against radio jamming signals.

Some thought has been given to concealing the anti-theft system so that the thief remains unaware of its existence and thus does not attempt to disable the system before stealing the vehicle. The problem with this idea is that it nullifies one of the supposed primary advantages of having an anti-theft system to begin with; namely, that a potential thief will be discouraged from attempting to steal vehicles which are known to be equipped with anti-theft systems.

SUMMARY OF THE INVENTION

The present invention overcomes the noted problems of the prior art systems using a system which is tamper-resistant and which need not remain concealed in order to remain effective. The system is one that can be used to protect a variety of property not just vehicles.

An anti-theft system constructed in accordance with the present invention receives a periodic enabling signal, referred to as a keep-alive signal, from a remote source. Each received keep-alive signal restarts a run period; that is a period of time during which the protected property will continue to operate normally. As long as a keep-alive signal continues to be received before the current run period expires, normal operation continues without interruption. The agency responsible for providing the periodic keep-alive signals will stop sending those signals when it learns that an attempt is being made to steal the protected property. Once the current run period expires, steps are initiated to disable the property or to otherwise make it unattractive to the thief to continue the attempt to steal the property.

A thief who attempts to defeat a system of the type described by breaking, jamming or otherwise disabling the receiver of the keep-alive signals will only ensure that the anti-theft operations are initiated at the end of the current timeout period.

BRIEF DESCRIPTION OF THE DRAWINGS

While the specification concludes with claims particularly pointing out and distinctly claiming that which is regarded as the present invention, details of preferred embodiments of the invention may be more readily ascertained from the following detailed description when read in conjunction with the accompanying drawings wherein:

DETAILED DESCRIPTION

Figure 1:
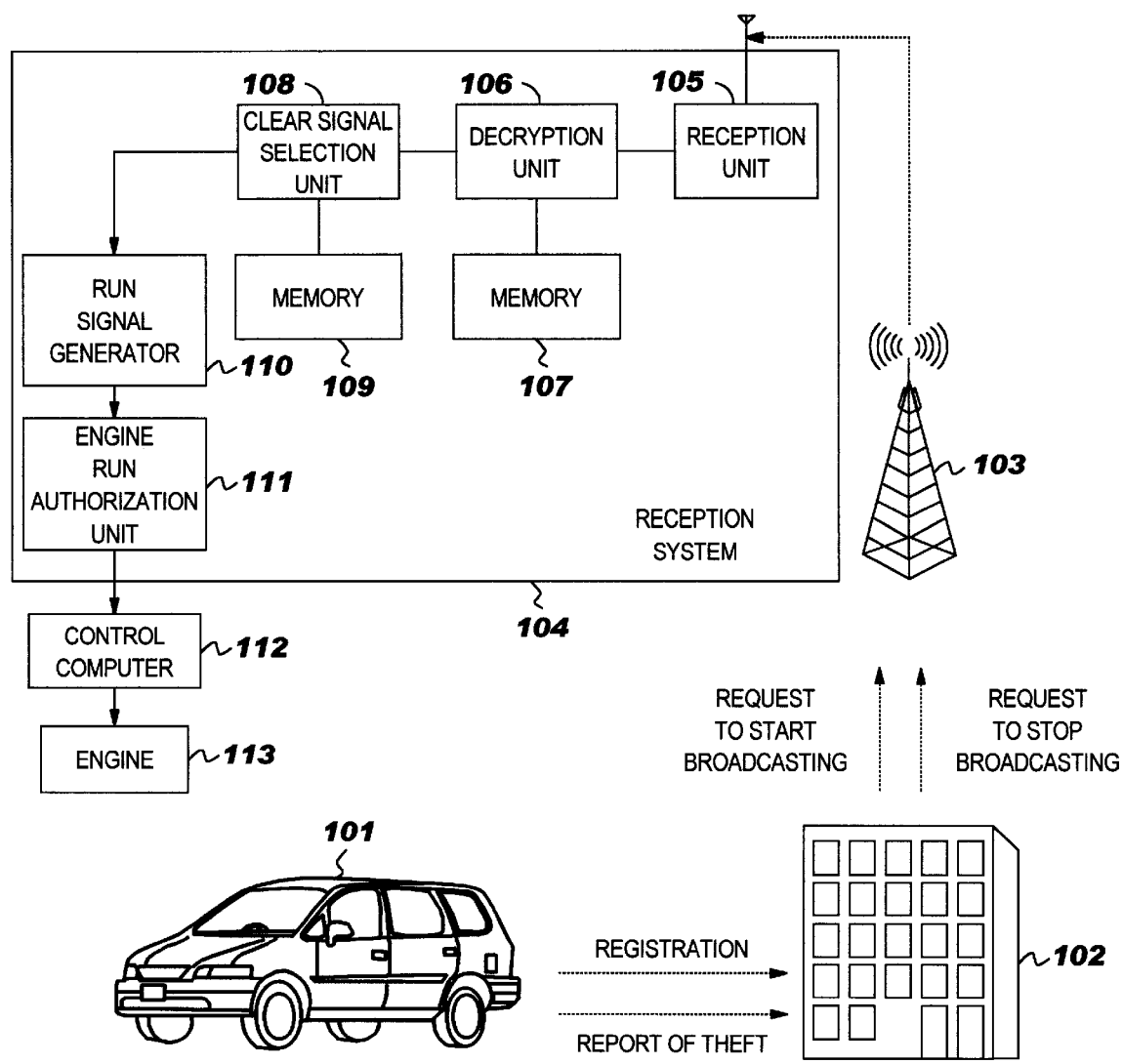
FIG. 1 is a block diagram of a complete anti-theft system according to a preferred embodiment of the invention.

FIG. 1 is an illustration of an anti-theft system constructed in accordance with a preferred embodiment of the invention. In the illustrated system, the property being protected is a vehicle 101. As will be described in more detail later, the anti-theft system can be used to protect many types of properties, not just vehicles. The anti-theft system uses a management agency 102 with which the vehicle 101 is registered. The management agency 102 has access to broadcasting facilities including a broadcasting tower 103 from which radio signals can be transmitted to the surrounding area.

The vehicle 101 includes a reception system 104 and a control computer 112 connected to the vehicle engine 113. The reception system 104 receives many radio signals but includes the capability of discriminating among those signals to detect a vehicle-specific enabling or keep-alive signal transmitted periodically from the broadcast tower 103. The signal discrimination requires that the reception system 104 detect codes embedded in the received radio signals to determine whether the embedded codes match vehicle-specific codes stored in reception system 104. As explained in more detail below, continued operation of the vehicle 101 depends upon periodic receipt of the appropriate keep-alive signals.

The reception system 104 includes a reception unit 105, a decryption unit 106 coupled to a memory 107, a clear signal selection unit 108 coupled to its own memory 109, a run signal generator 110, and an engine run authorization unit 111. The reception unit 105 performs the function of receiving radio signals and discriminating among those signals to identify signals intended for vehicle 101. To make it difficult for thieves to deceive the system, the keep-alive signals are preferably encrypted by the management agency 102 before the broadcast operation. Decryption unit 106 processes signals provided by reception unit 105 using a private key stored in memory 107. The clear signal selection unit 108 compares an enabling code that should appear in the received signal to an enabling code stored in its memory 109. If the compared codes match, unit 108 provides a signal to run signal generator 110, which responds by providing a run signal that remains valid for a predetermined period of time, that may be referred to as a run period. Run signals are processed by engine run authorization unit 111. The engine run authorization unit 111 is connected to a control computer 112 for the vehicle engine 113.

The functions of the reception system 104 may be performed primarily in software using general purpose hardware, primarily in hardware, or in a system using both hardware and software to accomplish the functions. The reception system 104 may be installed in the vehicle when manufactured or may be added later as an aftermarket unit. It is also possible that at least some of the functions of reception unit 105 may be performed by a conventional radio receiver.

Figure 3:
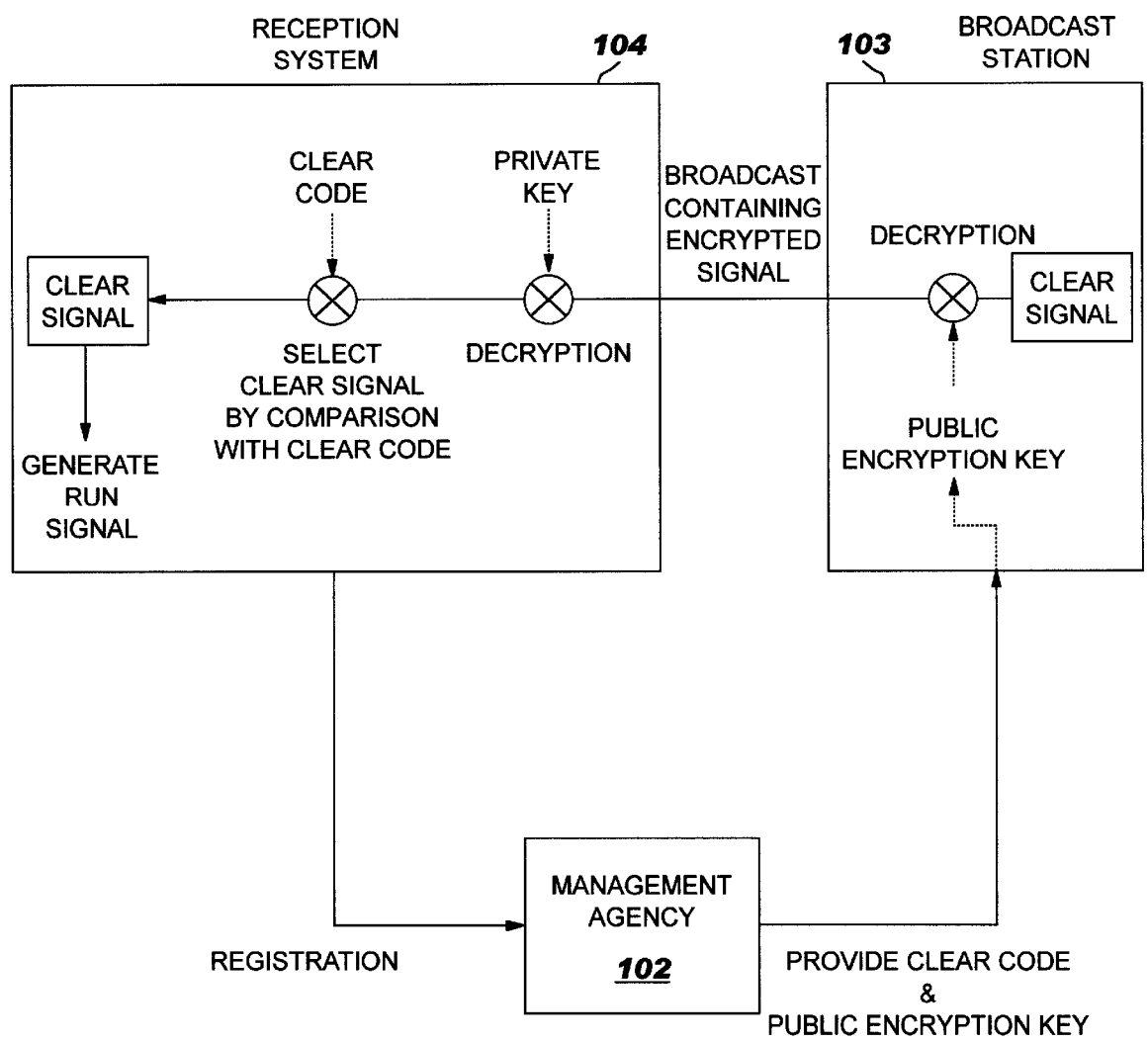
FIG. 3 is a block diagram of signal encryption and decryption operations that are performed in a preferred embodiment of the anti-theft system.

Referring briefly to FIG. 3, the steps required to set up the encryption/decryption operations will be described. Initially, the owner of the vehicle 101 must register the vehicle with the management agency 102. The registration application typically includes a unique serial number for the reception system 104. The agency 102 uses the reported serial number to generate a vehicle-specific enabling or clear code that must be included in transmitted signals and that must be matched by a code stored in reception system 104 before a run signal can be generated. The management agency also preferably uses the reported serial number to obtain a public key associated with the reception system 104. The public key is used to encrypt the transmitted radio signals. Signals encrypted using the public key can be properly decrypted only through the use of a private key stored in the reception system 104.

Once the vehicle 101 is registered and the necessary codes and keys are established, periodic broadcasting of a keep-alive signal specific to vehicle 101 is initiated at broadcast tower 103. Initially, broadcast signals may include codes necessary to activate the anti-theft system in the vehicle 101. These activation codes may either be deleted once system operation is established or may be continued but simply ignored by the anti-theft system. Each broadcast signal is specific to a particular registered vehicle. The number of keep-alive signals that must be broadcast during each broadcast cycle is, therefore, a function of the number of vehicles registered with the management agency 102. The length of the broadcast cycles is determined by the duration of run signals generated in vehicle-mounted reception systems. In a preferred embodiment, signals are broadcast at regular intervals, for example, at six hour intervals. The run signals then must have active periods longer than six hours. There is no requirement that the signals be broadcast on any regular schedule as long as the run signal lasts at least as long as the anticipated time interval between successive keep-alive signals.

Figure 2:
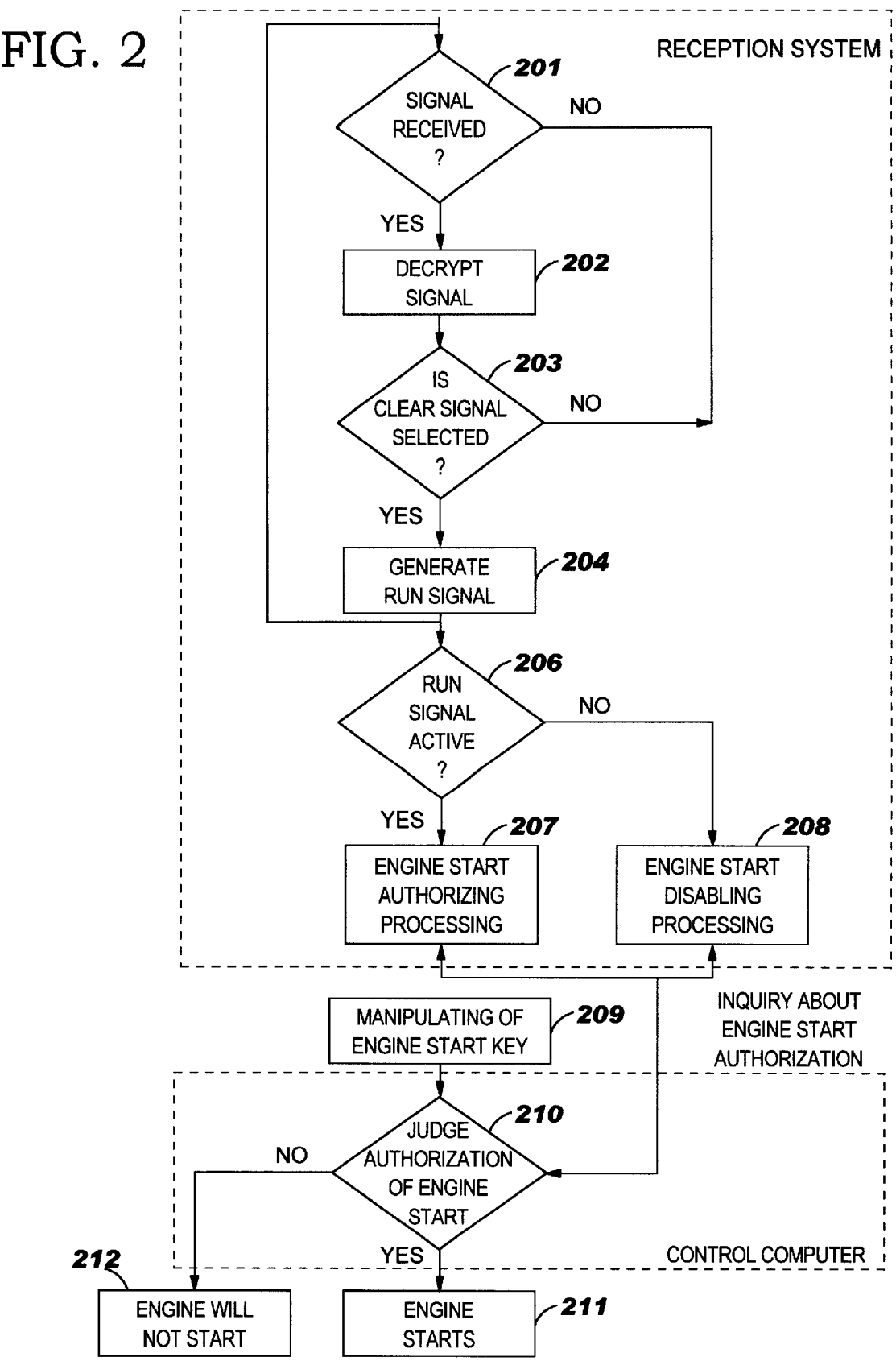
FIG. 2 is a flow chart describing operations that are performed by the anti-theft system.

FIG. 2 describes operations performed in the reception system 104. As already noted, the reception system 104 receives many radio signals and must be capable of discriminating among those signals to detect the keep-alive signal specific to the vehicle being protected. If the appropriate signal is detected in step 201, the signal is decrypted in the reception system 104 using the private key stored in a memory in the system. The decryption signal produces a clear signal. A valid clear signal includes a code specific to the registered vehicle. If this code is detected in operation 203, a run signal is generated in operation 204.

Periodically, reception system 104 determines in an operation 206 whether a valid run signal is still active. Operation 206 is performed asynchronously of operations 201–204. If a valid run signal exists when operation 206 is performed, an engine start authorization code is generated in a process 207. If no valid run signal exists, an engine start disabling code is generated in a process 208.

The next time an attempt 209 is made to start the engine, the engine control computer 112 generates a query to determine whether an engine start operation is currently authorized by the generated code. If an engine start operation is authorized, the engine will be allowed to start (operation 212). Otherwise, it will remain disabled (operation 211).

As long as the owner or another authorized user is operating the vehicle, the periodically generated keep-alive signals allow the vehicle to operate in its normal manner. However, once the management agency 102 learns that the vehicle has been stolen, no further keep-alive signals are broadcast. Without a keep-alive signal, reception system 104 cannot reinitialize the vehicle run signal. Once the current run period ends, the engine start disabling code is generated. The next time the user of the vehicle turns the engine off, he or she will not be able to restart that engine.

Different approaches may be taken to prevent a restart of the vehicle engine. The ignition system may be disabled. Mechanical interlocks may be activated to prevent the engine key from been inserted or from being turned. The steering wheel may be locked. The transmission gear selector may be disabled.

Where the property being protected is a motor vehicle, it would, of course, be possible to immediately disable the vehicle engine when the current run signal expires. Such an approach might prove unsafe not only for the vehicle occupants but also for others since there may be no way to know where and how the vehicle is being operated when the current run signal expires. For safety reasons, a preferred mode of operation is to allow the protected vehicle to continue to run until it is manually turned off.

For property other than vehicles, safety may not be an issue and different disabling strategies may be adopted.

An advantage of the present invention is that the steps normally taken by thieves to defeat anti-theft systems will actually improve the chances that the present system will function properly to deter theft. Destroying the receiving antenna immediately prevents the receipt of further keep-alive signals whether or not the theft has been discovered. Similarly, generating a jamming signal or even removing the reception system 204 has the same effect.

Moreover, because the system cannot be effectively disabled, there is no reason to conceal its existence. Making sure that thieves are aware of the existence of the system and of the futility of attempts to disable it will deter many. Faced with a vehicle protected a system which cannot be readily disabled, most thieves are likely simply leave the vehicle alone and move on to another, less well-protected vehicle.

There is no requirement with this system that any signals be broadcast from the vehicle to the management agency. Necessary signals are broadcast in one direction only using well-known signal broadcasting technology. Consequently, the initial costs and the operating costs for the system can be significantly lower than costs for comparable systems in which the vehicle itself must transmit signals to a central management agency.

Figure 4:
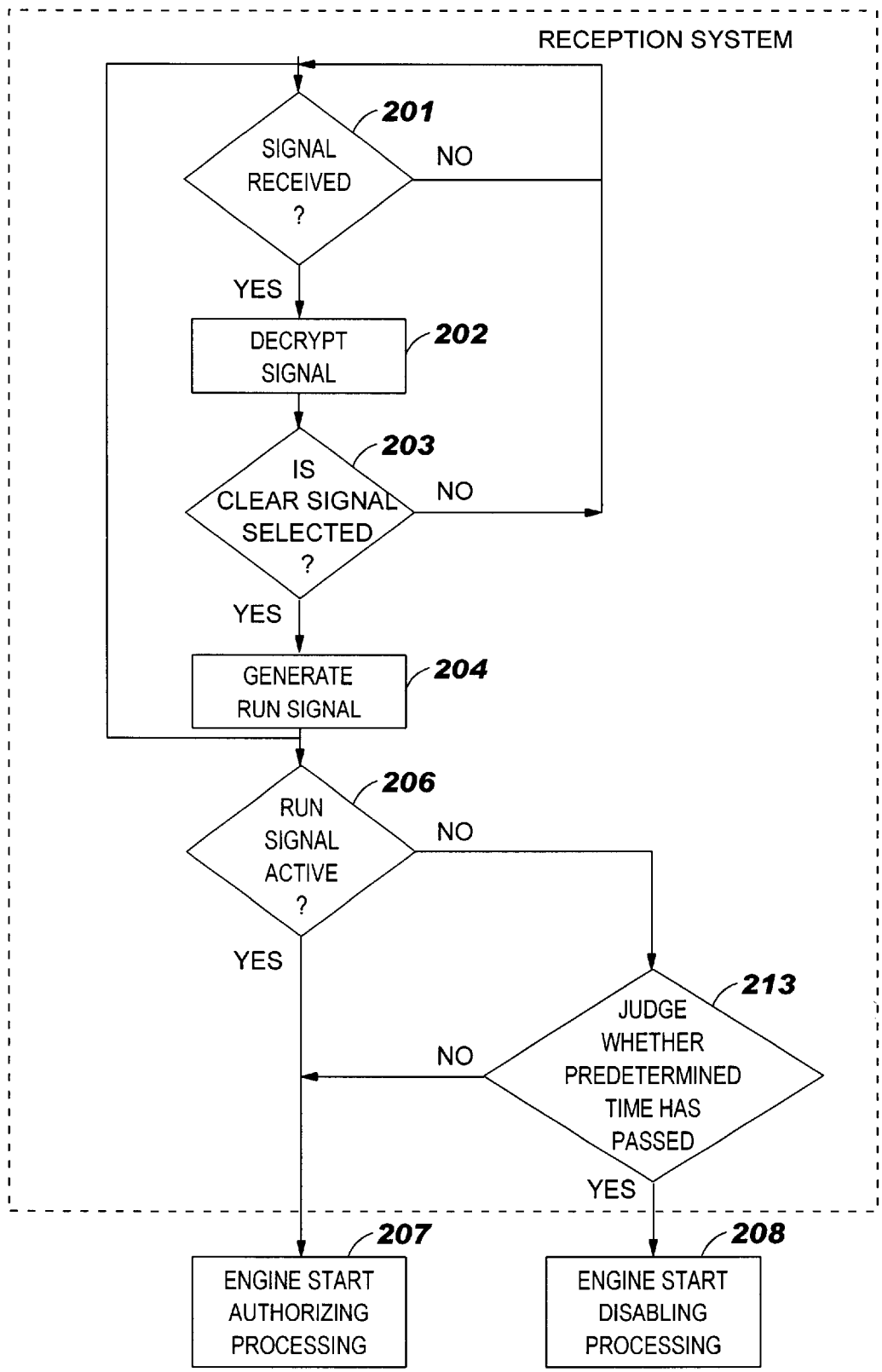
FIG. 4 is a flow chart describing operations that are performed where a grace period is incorporated into the system.

In an alternate embodiment, a grace period may be incorporated into the reception system 104. Even if the current run signal expires, steps will not be taken to prevent an engine re-start unless the grace period has also expired. FIG. 4 is a flow chart of steps that would be performed where a grace period is employed.

Figure 5:
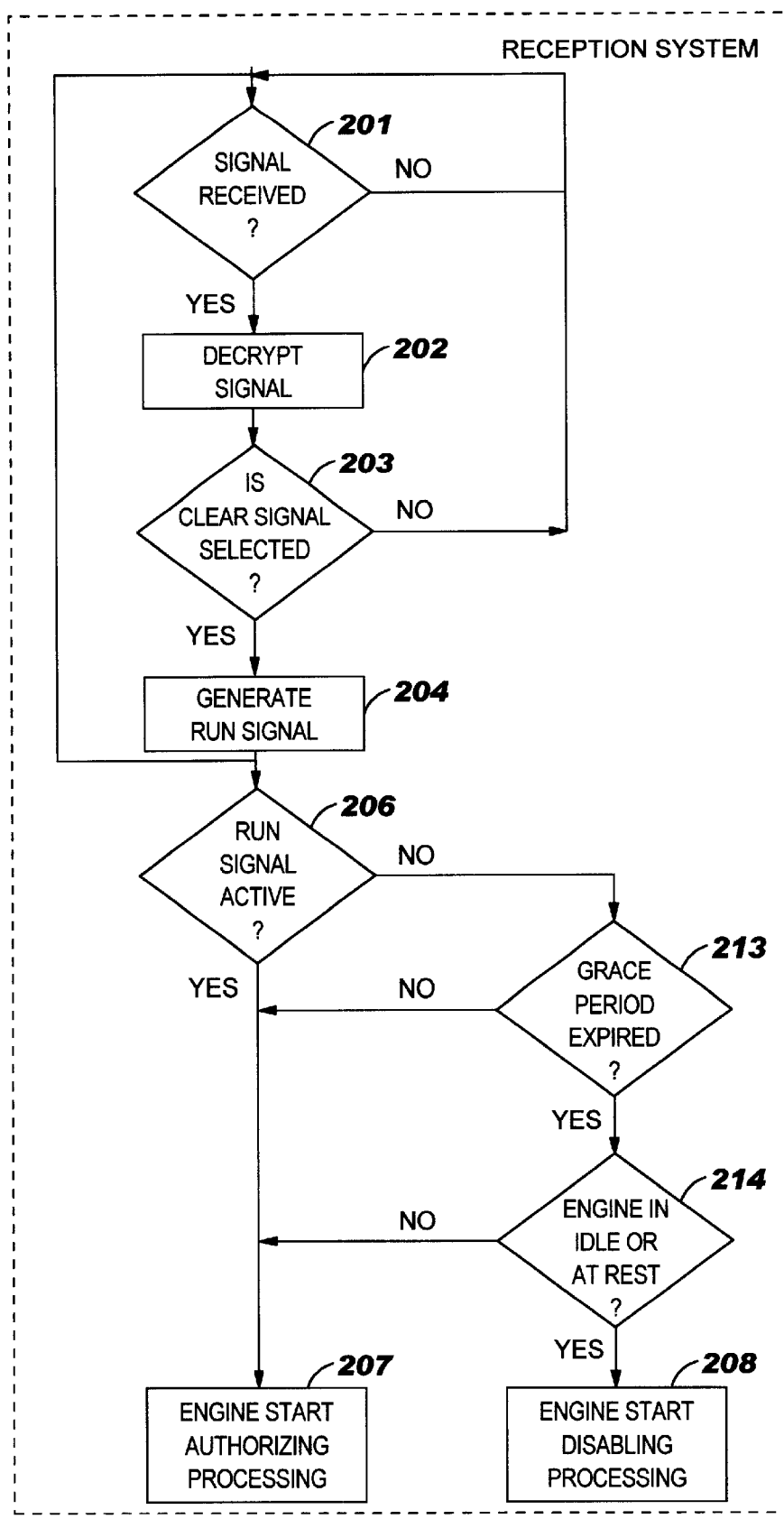
FIG. 5 is a flow chart describing operations that are performed in the course of a specific type of vehicle shutdown process.

In still another embodiment, the strategy may be adopted of disabling a still-running vehicle engine once it is determined that the engine is operating in an idle range, that is running at such a low speed that the vehicle is almost certainly no longer moving. FIG. 5 is a flow chart of the operations that would be performed in implementing this embodiment. The preliminary steps 201–204 and 206 are identical to previously described steps identified by the same reference numbers. In this embodiment, once it is determined that there is no longer a valid run signal, an operation 214 determines whether the vehicle engine is shut off or is operating in an idle range. One way of obtaining the latter information is to read the current engine speed (revolutions per minute) and to compare the current speed to an idle threshold speed. If the engine is operating at an idle level, an engine disable process 215 is initiated to shut down the engine. Once the engine is stopped, either by the vehicle user (before the run signal lapsed) or as a result of the forced shutdown described above, further restarts are precluded by the normal operation of the anti-theft system.

Figure 6:
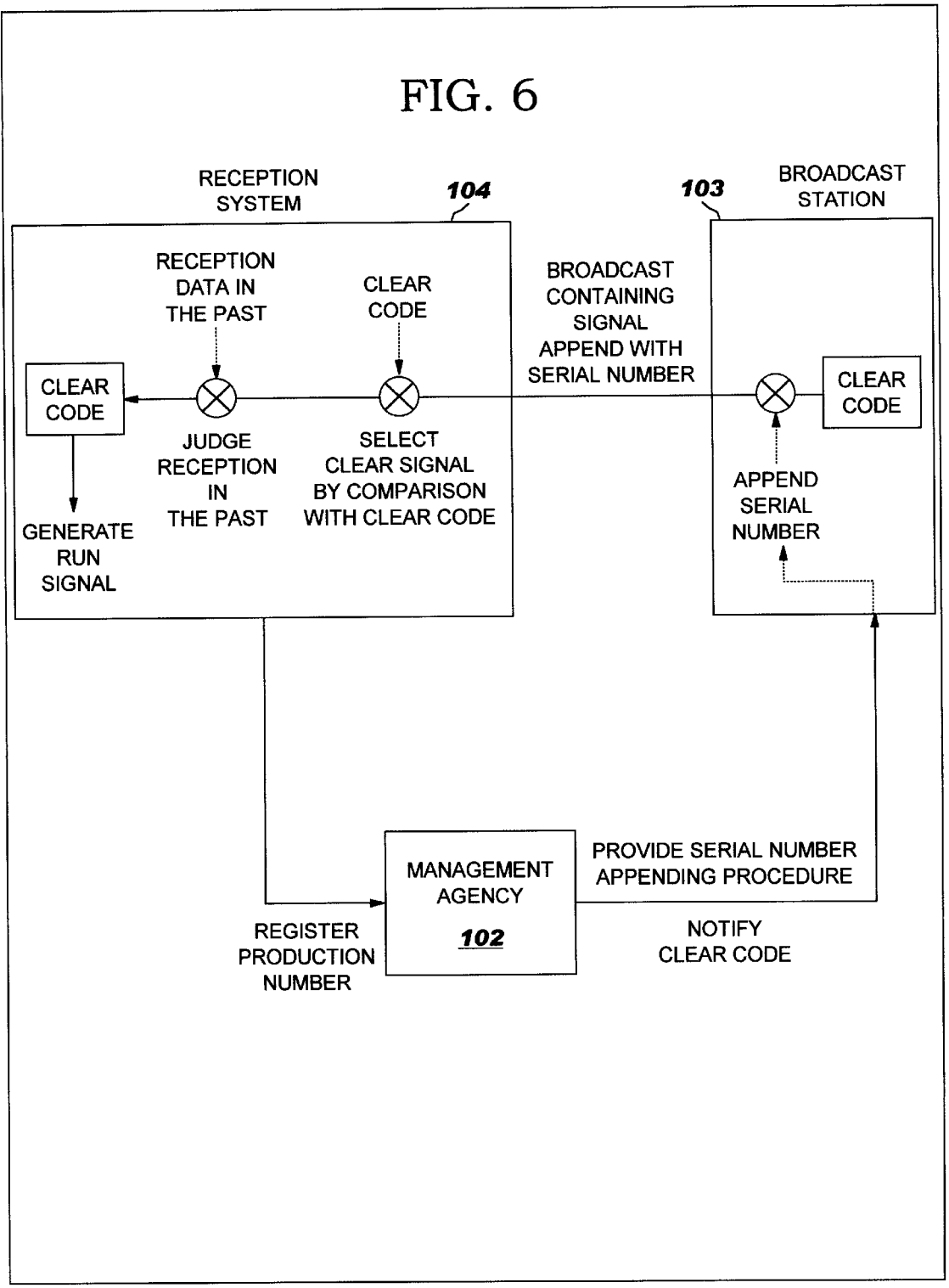
FIG. 6 is a block diagram of an alternate embodiment of a signal encryption/decryption system.

In another embodiment, the broadcast keep-alive signal is changed each time and the reception system is configured not to accept a broadcast signal that is identical to a previously received signal. The overall system arrangement is identical to that already described. FIG. 6 is a block diagram of the differences. In this embodiment, the broadcast signal is not encrypted but must still contain a code that the reception system recognizes as an enabling code for the registered vehicle. A number is appended to each broadcast signal. The first signal to be broadcast for a registered vehicle may use the serial number of the reception system installed in that vehicle. Thereafter the appended number may be changed at each broadcast cycle by using time-dependent values and/or randomly generated values as part of the appended number.

The reception system 104 must still be able to recognize the enabling signal by comparing it to a "clear code" value stored in its memory. Once the clear signal is recognized, system 104 compares that signal to signals received in the past and stored in a memory. If the current signal matches a previously received signal stored in memory, the current signal is rejected on the theory that a third party may have recorded a previously broadcast signal and be using the recording in an attempt to defeat the anti-theft system.

Additional changes could be made to further enhance the security of the signal transmitted from the broadcast tower. For example, if the value "New12345" were used as the initial enabling code and a six hour broadcast cycle was selected with broadcasts at 03:00, 09:00, 15:00 and 21:00 hours (24 hour time), the first broadcast could be a sum of "New12345" and time-related value "New0300", the second broadcast could be a difference of "New12345" and time-related value "New0900", the third broadcast could be a sum of "New 12345" and time-related value "New1500" while the fourth broadcast could be a difference of "New12345" and time-related value "New2100".

Figure 7:
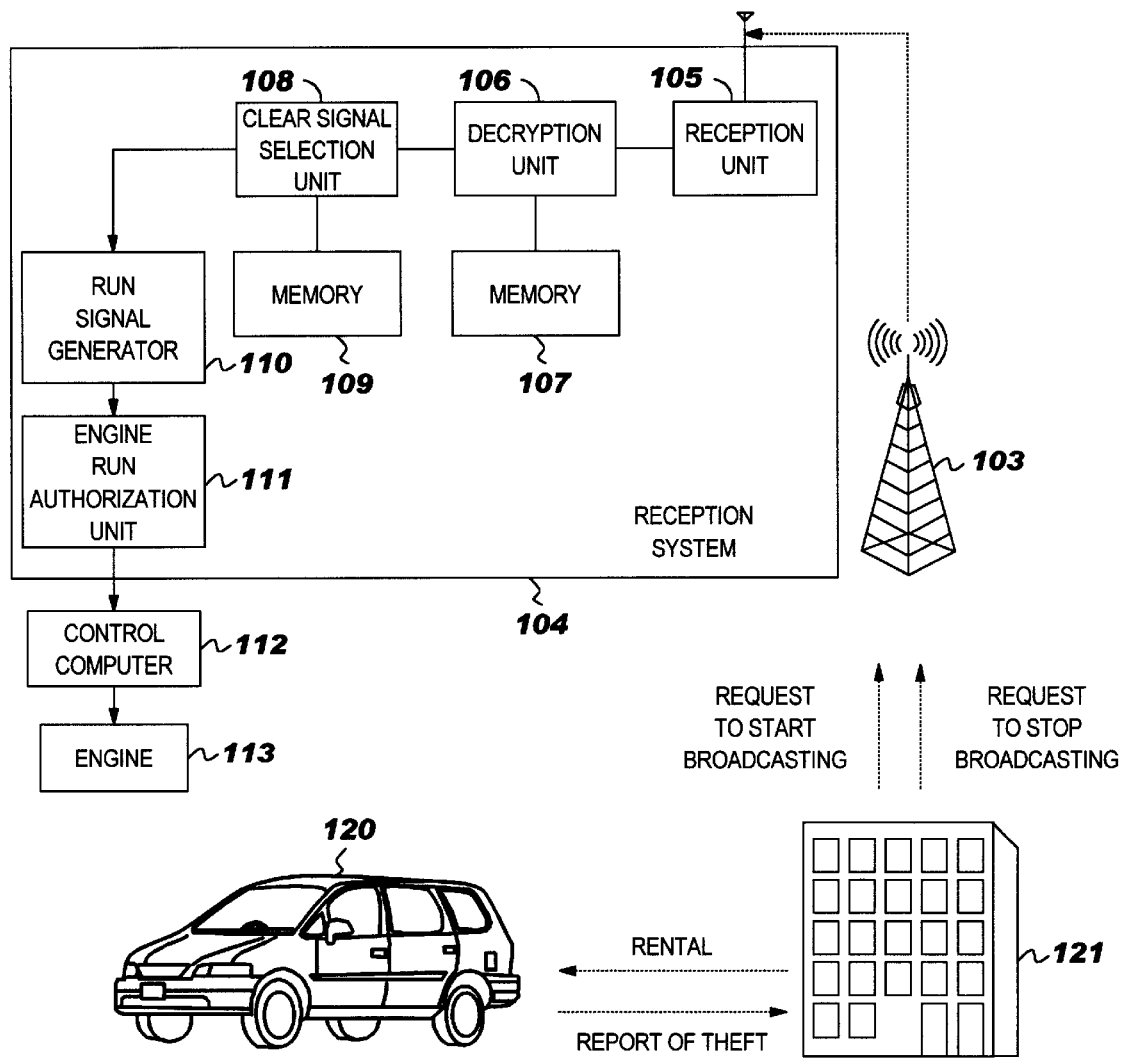
FIG. 7 is a block diagram showing how the system can be used to manage the checkout and use of a rental vehicle.

In accordance with still another embodiment of the invention, the invention can be used to manage the checkout of rental vehicles. FIG. 7 is a view of a system for providing anti-theft protection for such vehicles. While the drawing depicts a van, the same type of system to be used to protect other kinds of vehicles, such as cars, motorcycles, buses, trucks and construction vehicles. The only limitation is that the vehicle to be protected must be capable of carrying a reception system and must an engine or drive motor that can be enabled or disabled through the use of a control computer.

It can readily be seen that the system shown in FIG. 7 is very similar to the system previously described with reference to FIG. 1. In both systems, systems identified by the same reference numerals perform the same basic functions. One difference is that a vehicle rental company 121 will probably be responsible for initially installing the anti-theft reception system in a rental vehicle and thus will already have the serial number and other information required to differentiate this vehicle from other vehicles.

The vehicle rental company can begin broadcasting signals specific to the rental vehicle at the time of vehicle checkout. The signals will be broadcast periodically during the entire time the vehicle is supposed to be checked out. If, however, the vehicle is not returned at the expected time and if the vehicle rental company has not received information which explains the delay, the vehicle rental company can order that no further keep-alive signals be broadcast. Once the keep-alive signals end, the rental vehicle can still be used until the current run signal lapses.

The present invention can be used both to discourage use of a rental vehicle beyond the authorized time period and, if the broadcast system has a limited geographic coverage, to discourage renters from taking the vehicle beyond the limits of that coverage. Nothing in the system prevents the renter from leaving the broadcast area. However, if the broadcast signals don't reach the vehicle, the current run signal will eventually lapse and the vehicle may become disabled before the renter can return to the broadcast area.

Thus far, the anti-theft system has been described in the context of providing protection for vehicles of various types. The same type of system can, however, be used to protect other kinds of property provided normal use of the property is capable of being disabled upon theft or violation of rental agreements.

An example of a different kind of property that can be protected is a personal information terminal (PIT) with communication capabilities. PITs are commonly found in resorts and around tourist attractions where they can be preloaded with information useful to tourists and as guides on walking or driving tours. PITs are relatively expensive devices but are usually rented for relatively moderate fees. From the PIT owner's viewpoint, that makes it important that renters be encouraged to return PITs when they are supposed to rather than continuing to make unauthorized use of them or simply walking away with them with the idea of using them again at some point in the future.

Figure 8:
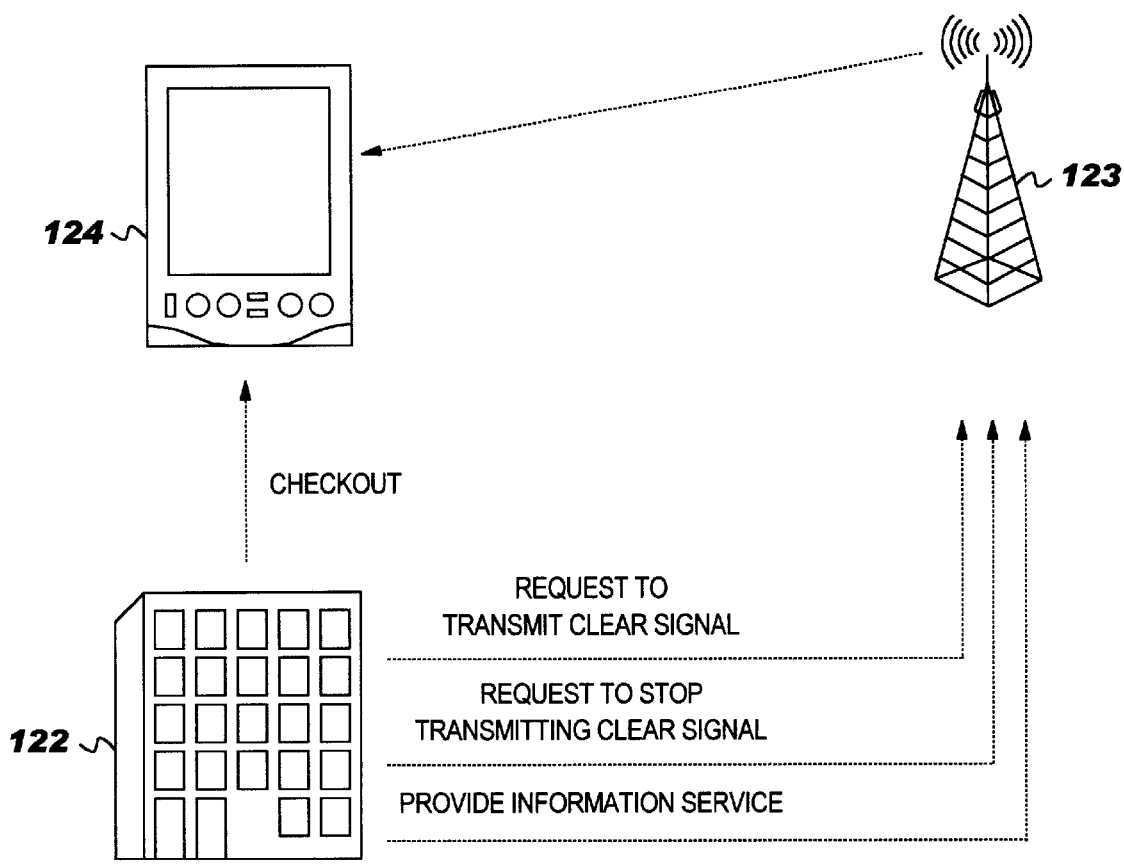
FIG. 8 is a schematic diagram showing how the system can be used to deter theft of an information-processing terminal.
Figure 9:
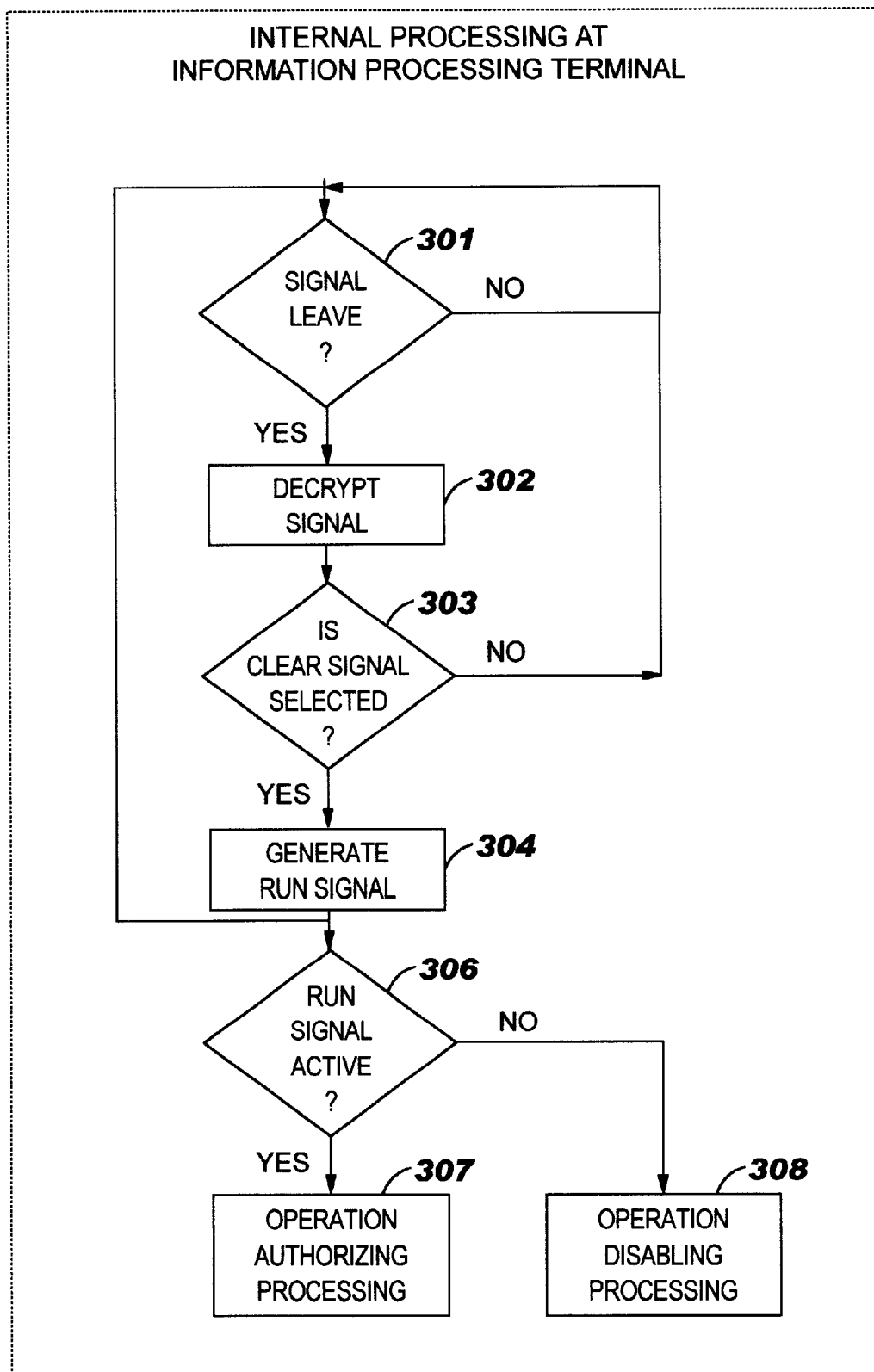
FIG. 9 is a flow chart describing operations that are performed where an information processing terminal is to be protected by a system constructed in accordance with the present invention.

FIG. 8 illustrates a system for protecting a PIT from theft. FIG. 9 is a flowchart of steps that are performed within the PIT as part of the anti-theft protection.

An information service company 122 rents PITs, such as PIT 124, to users and provides various kinds of information to the PIT users, through a broadcaster, such as a cellular telephone service provider 123. When the PIT is first checked out, it can be enabled by having the broadcaster send an enabling signal unique to the checked-out PIT. As noted earlier, the enabling signal may be encrypted using a public key paired with a private key contained in memory on the PIT.

During the period of authorized use of the PIT, the enabling or keep-alive signals are periodically broadcast. As long as keep-alive signals are received (operation 301) and properly decrypted (operation 302) and have the proper command format (operation 303), generated run signals give the user continuous access to the PIT contents. Once the period of authorized use ends, the information service company 122 will instruct the broadcaster 123 to step sending out the keep-alive signals. When the run signal currently active in the PIT lapses, appropriate steps can be taken to prevent the user from accessing the PIT contents. Because the PIT devices are normally almost purely electronic devices, the disabling operation itself will preferably be electronic under the control of a special purpose circuit or processor within the PIT.

Of course, if the PIT is reported stolen within the period of authorized use, the company can order the broadcaster to immediately stop sending keep-alive signals, thus limiting the value of the PIT to the thief.

If area covered by the broadcast area is limited, the anti-theft system can also be used to discourage users from leaving the area with the PIT for the same reasons the vehicle anti-theft system can be used to discourage vehicle renters from leaving an authorized area.

PITs are only an example of rentable electronic devices which might be protected by anti-theft systems in accordance with the present invention. Mobile phones, pagers, Global Positioning System devices, and portable computers are examples of other devices that can be protected.

Preferred and alternate embodiments of the invention have been described. Further variations are possible. Depending on the type of property being protected, once a theft report is received, it may be possible to safely disable the vehicle immediately rather than simply to prevent re-starts. For property of this type, the present invention might be used in combination with a conventional system of the type that can send an immediate disabling signal. If a theft is reported during normal working hours, the present invention might be used to eventually disable the vehicle. If a theft is reported at night, an immediate disabling signal might be sent followed by cessation of broadcasting of further keep-alive signals. Unless the thief had already destroyed the receiving antenna or taken other steps to prevent receipt of broadcast signals, the immediate disabling signal could shut the vehicle down. If the thief had destroyed the receiving capabilities of the system, the operation of the present invention would still eventually result in the vehicle being disabled.

Another variation would be to automatically notify the owner of the property that the current run period had already expired or was about to expire. Such notice, deliverable via cellular phone service, pager service and the like, might put the owner on notice that something was wrong, resulting in faster theft reports.

Figure 10:
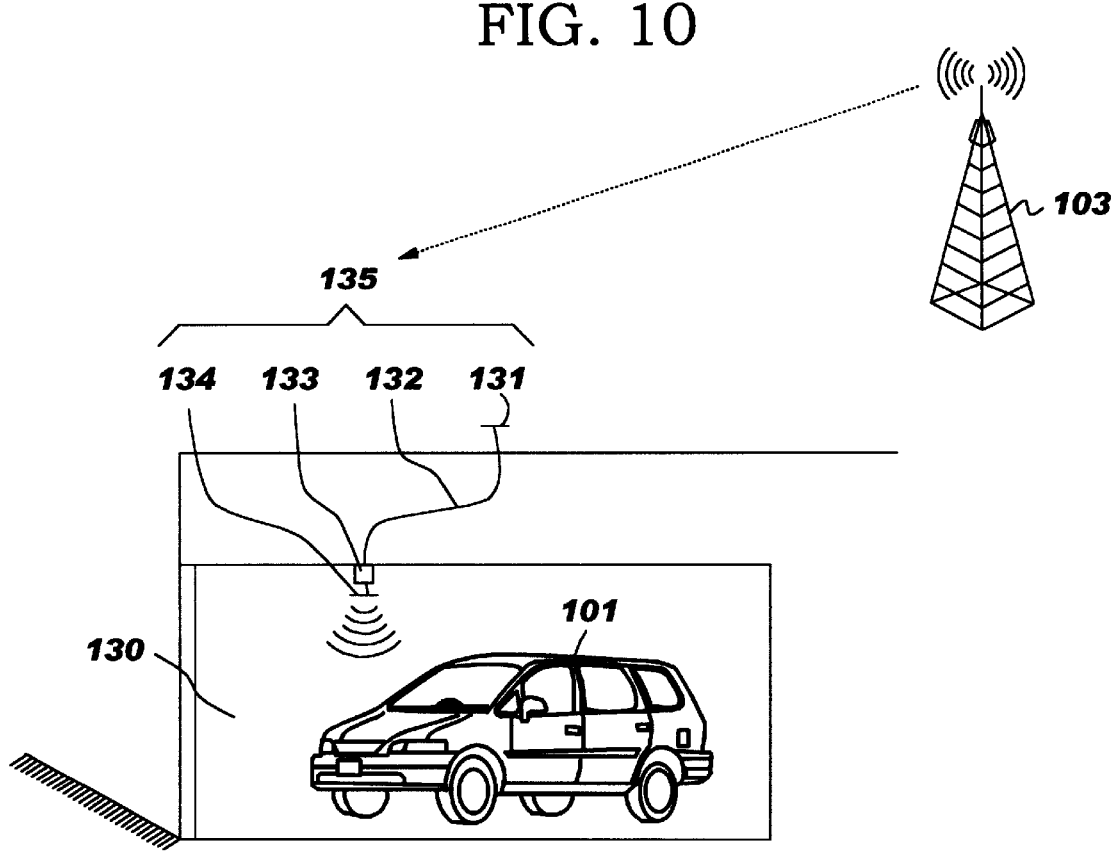
FIG. 10 is an illustration of the use of signal repeaters that may be required to propagate keep-alive signals into areas in which the reception of normal radio signals would be degraded by environmental factors.

As has already been noted, normal use of protected property depends on the periodic receipt of broadcast keep-alive signals. It is well known that normal broadcast signals can't reach certain areas, such a below-ground parking, some parts of covered parking decks or at least parts of subsurface roadways; e.g., tunnels. FIG. 10 shows a signal repeater 135 installed at an underground parking lot 130. The signal repeater includes an external antenna 131 for receiving broadcast keep-alive signals, a signal cable 132 leading to an amplifier 133 and a radiating antenna 134 for radiating the repeated and amplified keep-alive signal into the underground area.

What is claimed is:

1. A control method for deterring the theft of an item, comprising:
   a) receiving an enabling signal by
      receiving a broadcast signal,
      determining whether the signal is identical to any previously received signals, and
      rejecting any signal found to be identical to a previously received signal;
   b) responding to a received enabling signal by generating a run signal having a predetermined duration;
   c) periodically determining whether there is a currently active run signal;
   d) if it is determined that a run signal is currently active, generating a start code which allows the item to be reactivated if later shut off.

2. A control method as set forth in claim 1 including the further steps of responding to a determination that there is no currently active run signal by:
   determining whether the current operating condition of the item would permit it to be disabled without creating a hazard for users of the item or others; and
   immediately disabling the item if it is determined that no hazard would be created.

3. A control system for deterring the theft of an item, comprising:
   a) a broadcast receiver for receiving an enabling signal, said broadcast receiver including comparison logic for determining whether the received signal is identical to any previously received signals and control logic for rejecting any received signal found to be identical to a previously received signal;
   b) a run signal generator responsive to a received enabling signal to generate a run signal having a predetermined duration;
   c) logic for periodically determining whether a run signal is currently active;
   d) a control unit responsive to a first predetermined output from the logic to generate a start code which allows the item to be reactivated if later shut off.

4. A control system as set forth in claim 3 wherein the control unit is responsive to a second predetermined output from the logic to determine whether the current operating condition of the item would permit it to be disabled without creating a hazard for users of the items or others and to immediate disable the item if it is determined that no hazard would be created.

* * * * *